H. B. PALMER.
CLAMP MACHINE.
APPLICATION FILED MAR. 6, 1922.
1,420,941. Patented June 27, 1922.
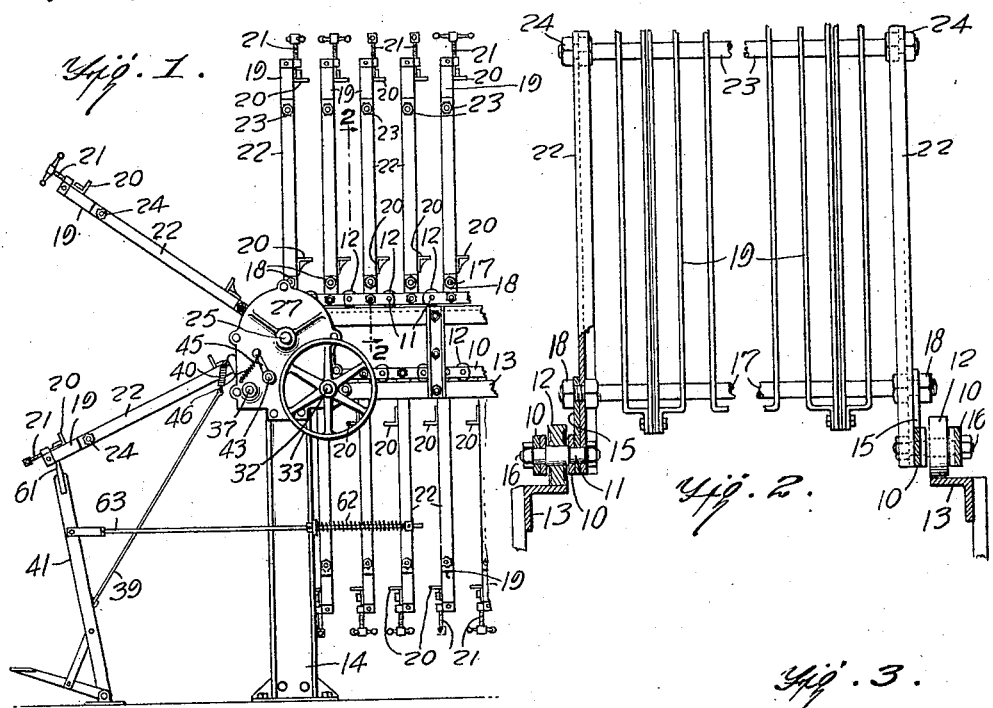
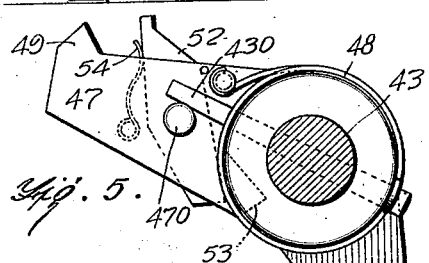
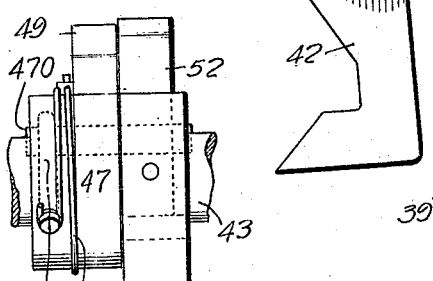
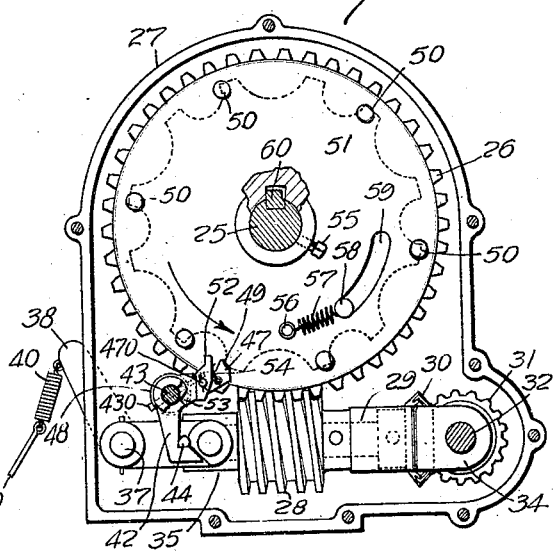
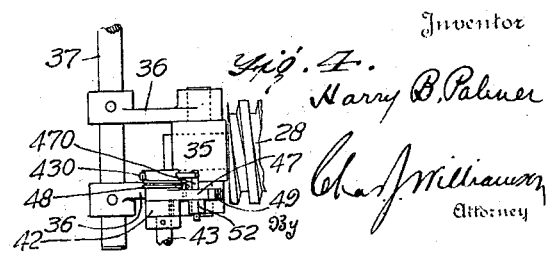
Inventor
Harry B. Palmer
Chas. J. Williamson
Attorney

UNITED STATES PATENT OFFICE.

HARRY B. PALMER, OF OWOSSO, MICHIGAN, ASSIGNOR TO ALBERT E. PALMER & SONS, OF OWOSSO, MICHIGAN, A COPARTNERSHIP.

CLAMP MACHINE.

1,420,941.   Specification of Letters Patent.   Patented June 27, 1922.

Application filed March 6, 1922. Serial No. 541,368.

*To all whom it may concern:*

Be it known that I, HARRY B. PALMER, residing at Owosso, county of Shiawassee, and State of Michigan, a citizen of the United States, have invented certain new and useful Improvements in Clamp Machines, of which the following is a specification.

My invention relates to machines comprising traveling clamps which hold glued work while the glue is setting or drying, such machines comprising clamps arranged in an endless series which move through a fixed path so that one at a time they are presented at the point where the freshly glued work is to be placed in them by the workmen and the dried or set work removed, and the object of my invention is to improve such machines in respect of the manner of mounting or supporting the clamps and the mechanism for driving or moving the clamps, and my invention consists in any construction described by or included within the terms or scope of the appended claims.

In the annexed drawings:—

Fig. 1 is an elevation of a portion of a clamp machine embodying my invention;

Fig. 2 is a section on line 2—2 of Fig. 1;

Fig. 3 is a detail view in elevation of the endless conveyor driving mechanism with the casing cover removed.

Fig. 4 is a top plan view of a portion thereof;

Figs. 5 and 6 are detail views in elevation of the latch device.

The type of clamp machine in which I have embodied my improvements is one in which the clamps are carried by parallel endless chains or conveyors between which the clamps extend in rows and from which they project, the rows of clamps being parallel through the horizontal runs of the chain and diverging in radial directions from one another in passing around the sprocket wheels, the spreading apart of the rows of clamps by such radial divergence affording opportunity for the workmen to put work in the clamps and remove it therefrom.

Each endless chain consists of pairs of links, 10, spaced apart with the ends of adjacent pairs overlapping and pivoted by pins, 11, which also form pivots or journals for anti-friction rollers, 12, which run upon upper and lower parallel horizontal rails, 13, that are situated at each side of the machine and supported by posts or up-rights, 14, to which they are bolted. Alongside the inner one of each pair of plates is placed the inner portion of an outwardly projecting arm, 15, an arm and the plate alongside which it is placed being secured by bolts, 16, or otherwise, and the outwardly projecting portions of alining arms on the opposite sides of the machine are connected by a long bolt or rod, 17, which passes through holes in the arms, and on the outer side of the latter are threaded to receive nuts, 18, the chains on opposite sides of the machine being thus tied together by said rods. Mounted upon each of the rods, 17, in a row or series extending from side to side of the machine are the clamps, each of which comprises a metal frame, 19, formed of parallel bars which are perforated for the passage of the rod and which just inside the rod are connected together, and opposing clamping jaws, 20, mounted on said frame, one of said jaws being towards the outer end of the frame and having a screw, 21, for sliding it. At each end of the row or series of clamps there is a flat rod or bar, 22, which extends parallel with the clamp frames and which at its inner end has a hole through which the rod passes and which extends alongside the arm so that the bolt, 16, which secures the arm, also secures such flat rod and thus the arm by both the bolt and the rod, 17, is rigidly connected to the chain links. Each flat rod or bar, 22, at its outer end is connected to an alining flat rod or bar, 22, at the opposite side of the machine by a link bolt or rod, 23, and such rod also passes through holes near the outer end of the clamp frames, the rod having on its outer ends nuts, 24, for securing it and thus the clamps are supported near their outer end.

Each chain at each end of the machine passes over a sprocket wheel, the pair of sprocket wheels at the same end of the machine being mounted on the same horizontal shaft, 25.

Power is applied to the shaft, 25, near the end of the machine where the workman stands, and means under the control of the workman are provided by which he can control the movement of the endless chain and the clamps carried thereby so that the travel of the clamps may be stopped for the removal of finished work and the placing of new work, the arrangement being such that the movement is stopped automatically at the desired point but is started by a starting device under the control of the workman, and I will now describe the mechanism I have invented for this purpose. Upon the shaft, 25, which receives the driving power, and at one side of the machine is fixed a worm wheel, 26, which is contained in a box or housing, 27, mounted on the outside of the adjacent post or up-right. Below the worm wheel is a worm, 28, on a shaft, 29, having at one end a bevel gear, 30, which meshes with a like gear, 31, on a horizontally extending shaft, 32, to which is secured a pulley, 33, which is belted to a suitable driving pulley, not shown, and thus the worm is revolved. The worm shaft is journaled in bearings in a swinging yoke, 34, which is pivotally hung at one end on the shaft, 32, and by the movement of such yoke the worm may be moved into or out of mesh with the worm wheel. The worm wheel shaft at its end opposite the yoke is journaled in a block, 35, which is straddled by a pair of arms, 36, which at one end are pivotally connected with said block and at the other end are pinned to a rock shaft, 37, which projects back of the casing, 27, where it has fixed to it a crank arm, 38, which by a link, 39, that includes a spring, 40, is connected with a treadle actuated frame, 41, so that by depressing the treadle, the link, 40, may be caused to rock the shaft, 37, in the direction to lift the worm into mesh with the worm wheel and thus connect the power shaft with the chain driving shaft, 25. A latch mechanism is provided which holds the worm in mesh with the worm wheel. Such mechanism includes a latch arm, 42, mounted on a shaft, 43, which has a hook at its free end which is adapted to pass under an outwardly projecting pin, 44, on the worm-lifting arm, 36, and the latch is moved to cause the engagement of its hook with said pin by means of a crank finger, 45, on the end of the shaft, 43, outside the box or housing, 27, and a spring, 46, on the outside of the box which at one end is connected with said finger and at the other end is attached to the box. Mounted on the shaft, 43, alongside the latch arm, 42, is an arm, 47, which is capable of rocking or swinging movement to a limited extent upon the shaft, 43, the movement being limited by coacting surfaces on the arm and the shaft, such, for example, as a pin 430 fastened to the shaft and a projection 470 on the arm and pin and projection are yieldingly held in contact by a coil spring, 48, one end of which is connected with the arm. The arm, 47, has a tooth or lug, 49, which projects towards the worm wheel shaft and is adapted to be engaged by any one of a series of pins or studs, 50, that project outwardly from a disk or plate, 51, which is mounted on the shaft, 25, alongside the worm wheel, and when such tooth or lug, 49, is engaged by a moving pin or stud, 50, the arm, 47, will move outward and will act as presently described to rock the latch arm, 42, to disengage it from the pin, 44, and allow the worm to drop out of mesh with the worm wheel. On the outer side of the arm, 47, is pivoted a dog, 52, the upper end of which is in the path of the pins, 50, so that when engaged by a pin, the dog at its lower end will be moved into engagement with a shoulder, 53, on the latch arm, 42. The action of the dog moving pin, 50, on the tooth, 49, of the arm, 47, will rock the latter outward and through the engagement of the dog, 52, with the latch arm, 42, the latter will be swung in the direction to remove its hook from beneath the pin, 44. The hook of the latch arm, 42, has its outer and upper portion beveled so that when the latch arm is moved far enough to free the pin, 44, the weight of the worm and the other falling parts will result in a camming action of the pin on the bevel nose of the hook and will continue the movement of the latch arm far enough to disengage the shoulder of the latch arm, 42, from the dog, 52, and thus leave the latch arm, 42, free to again be moved into latched engagement with the pin, 44, should the worm be lifted into mesh with the worm wheel even though at such time the arm lug, 49, might be in contact with a pin, 50, and hence the arm, 47, be unable to move with the latch arm, 42. A spring, 54, attached at one end to the side of the arm, 47, acts upon the dog, 52, to move it out of engagement with the shoulder, 53, of the latch arm.

The circular plate or disk, 51, is secured to the shaft, 25, as by means of a set screw, 55, to enable the disk to be rotatably adjusted in order to properly time the engagement of its studs or pins, 50, with the worm releasing latch mechanism.

Attached at one end to a bolt, 56, on the outside of the disk, 51, is a coil spring, 57, whose other end is attached to a bolt, 58, which is attached to the adjacent side of the worm wheel and projects through an opening, 59, provided in the disk, 51, for that purpose, the opening, 59, being elongated or a slot in order to allow the rotatable adjustment of the disk, 51, before described. The worm wheel is secured to the shaft, 25, by a key, 60, the key way in the worm wheel being slightly wider than the key so that there will be a certain amount of lost motion of worm wheel before the worm wheel and shaft are drivingly connected by the key and key-way, and in taking up this lost motion the worm wheel pulls against the spring, 57, which when free to act moves the worm wheel in the direction opposite that in which it is driven by the worm, the purpose of this arrangement being to allow the worm easily and fully to engage the worm wheel before the driving load is thrown upon the latter and to allow the worm wheel to be put in motion before it takes up the load of propelling the endless chains and the clamps.

At the top of the treadle operated frame, 41, is a horizontal bar, 61, which supports the clamps at their outer ends at the time work is to be placed in or removed from the clamps and the frame is yieldingly held in position for the bar, 61, to engage the clamps by a spring, 62, acting upon a rod, 63, that is connected with the frame, 41. By the depression of the treadle the support, 61, is moved out of the path of the clamps and simultaneously the worm and the worm wheel are moved into mesh to start up the movement of the clamp conveyor mechanism.

It will be understood that there are surfaces on the sprocket wheels which coact with the inner ends of the clamp bar supports in such a way as to rigidly support the clamps in a radial position as they move about the sprocket wheels, and similarly the clamp bars are supported in a rigid position when traveling over the horizontal tracks or bars, 13.

What I claim is:

1. In a machine of the kind described, the combination of a pair of endless chains, arms attached to and projecting outward from the chain links, rods connecting alining arms, and clamps mounted side by side upon the rods.

2. In a machine of the kind described, the combination of a pair of endless chains each composed of pairs of links spaced apart, arms extending outward from between the pairs of links and rigidly attached thereto, rods extending between alining arms, and clamps mounted side by side on said arms.

3. In a machine of the kind described, the combination of a traveling clamp support, and means for intermittently driving said support comprising a worm wheel, a worm, a movable support for the worm, means to move the support to place the worm in mesh with the worm wheel, a latch device to hold them in mesh, and automatic means to release said latch device.

4. In a machine of the kind described, the combination of a traveling clamp support, and means for intermittently driving said support comprising a worm wheel, a worm, a movable support for the worm, means to move the support to place the worm in mesh with the worm wheel, a latch device to hold them in mesh, and automatic means to release said latch device, comprising a rotating member which receives its motion from the worm.

5. In a machine of the kind described, the combination of a traveling clamp support, and means for intermittently driving said support comprising a worm wheel, a worm, a movable support for the worm, means to move the support to place the worm in mesh with the worm wheel, a latch device to hold them is mesh, and automatic means to release said latch device, comprising a rotating member which receives its motion from the worm, said rotating member being adjustable to time its action.

6. In a machine of the kind described, the combination of a traveling clamp support, and means for intermittently driving said support comprising a worm wheel, a worm, a movable support for the worm, means to move the support to place the worm in mesh with the worm wheel, a latch device to hold them in mesh, and automatic means to release said latch device, said latch device comprising a pivoted latch arm, a pivoted lug-carrying finger, and releasable means temporarily connecting finger and arm.

7. In a machine of the kind described, the combination of a traveling clamp support, driving means and a gear connection between the latter and said support that includes a lost motion connection and a yielding take-up.

8. In a machine of the kind described, the combination of a traveling clamp support, driving means, a gear connection between the latter and said support that includes a lost motion connection, comprising a shaft, a wheel having a limited loose connection with the shaft, and a spring that holds said wheel at one limit of its movement relative to the shaft.

9. In a machine of the kind described, the combination of a traveling clamp support, driving mechanism for intermittently moving said support including automatic stopping means, a movable clamp rest, and means for starting said driving mechanism actuated when said clamp support is moved out of clamp supporting position.

In testimony whereof I hereunto affix my signature.

HARRY B. PALMER.